(12) United States Patent
Hsu et al.

(10) Patent No.: US 9,413,553 B2
(45) Date of Patent: Aug. 9, 2016

(54) NETWORK ACCESS CONTROL BASED ON RISK FACTOR

(71) Applicant: International Business Machines Corporation, Armonk, NY (US)

(72) Inventors: John J Y Hsu, Taipei (TW); Sridhar R. Muppidi, Austin, TX (US); Kaifu Wu, Taipei (TW); Rick M F Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 14/067,759

(22) Filed: Oct. 30, 2013

(65) Prior Publication Data

US 2014/0122651 A1  May 1, 2014

(30) Foreign Application Priority Data

Oct. 31, 2012 (TW) .............................. 101140276 A

(51) Int. Cl.
*G06F 15/16* (2006.01)
*H04L 12/46* (2006.01)
*H04L 29/06* (2006.01)

(52) U.S. Cl.
CPC ........ *H04L 12/4641* (2013.01); *H04L 12/4625* (2013.01); *H04L 63/0209* (2013.01); *H04L 63/0272* (2013.01)

(58) Field of Classification Search
CPC ............ H04L 12/4625; H04L 12/4641; H04L 63/0209; H04L 63/0272
See application file for complete search history.

(56) References Cited

U.S. PATENT DOCUMENTS

| 6,151,628 | A * | 11/2000 | Xu et al. ........................ 709/225 |
| 7,228,345 | B2 * | 6/2007 | Larson ................ H04L 12/4641 709/222 |
| 7,546,458 | B1 * | 6/2009 | Singla ................. H04L 12/4645 380/255 |
| 7,549,162 | B2 * | 6/2009 | Aaron ............................. 726/12 |
| 7,908,644 | B2 * | 3/2011 | Roskind et al. .................... 726/3 |
| 8,051,210 | B2 * | 11/2011 | Larson .................. H04L 49/351 370/245 |

(Continued)

FOREIGN PATENT DOCUMENTS

CN          101714927 A       5/2010

OTHER PUBLICATIONS

Qazi, Hasham U., "Comparative Study of Network Access Control Technologies", Linkopings University, Department of Computer and Information Science, Final Thesis, May 11, 2007, 114 pages.

(Continued)

*Primary Examiner* — Ramy M Osman
*Assistant Examiner* — Thorne E Waugh
(74) *Attorney, Agent, or Firm* — Stephen R. Tkacs; Stephen J. Walder, Jr.; Gail Zarick

(57) ABSTRACT

A networking device based on risk factors is provided. The device includes a first communication interface, connected to a first LAN and a second LAN respectively; a second communication interface, connected to a network; a control module, electrically coupled to the first communication interface and the second communication interface respectively, wherein a user terminal has a network communication with the control module via the network, and the control module calculates a risk factor with respect to the user terminal, and determine connecting the user terminal to either the first LAN or the second LAN according to the risk factor; particularly, the first LAN and the second LAN could be VLAN respectively.

16 Claims, 3 Drawing Sheets

(56) References Cited

U.S. PATENT DOCUMENTS

| | | | |
|---|---|---|---|
| 8,054,840 B2 | 11/2011 | Booth et al. | |
| 8,127,350 B2 | 2/2012 | Wei et al. | |
| 8,171,538 B2* | 5/2012 | El Husseini et al. | 726/12 |
| 8,195,820 B2* | 6/2012 | Merkow et al. | 709/229 |
| 8,601,569 B2* | 12/2013 | Segre et al. | 726/15 |
| 8,671,207 B2* | 3/2014 | Fukuda | 709/229 |
| 8,813,172 B2* | 8/2014 | Reus et al. | 726/1 |
| 2004/0073712 A1* | 4/2004 | Larson | H04L 49/351 709/249 |
| 2004/0090972 A1* | 5/2004 | Barrett | H04L 63/0272 370/401 |
| 2004/0187022 A1* | 9/2004 | Asada | H04L 63/105 726/14 |
| 2005/0120231 A1* | 6/2005 | Harada | H04L 63/145 713/189 |
| 2006/0036869 A1* | 2/2006 | Faught | 713/182 |
| 2006/0294580 A1* | 12/2006 | Yeh | 726/3 |
| 2008/0301801 A1 | 12/2008 | Jothimani | |
| 2009/0217358 A1 | 8/2009 | Kumar et al. | |
| 2009/0254967 A1* | 10/2009 | J. | H04L 63/20 726/1 |
| 2010/0071043 A1 | 3/2010 | Babula et al. | |
| 2010/0081417 A1 | 4/2010 | Hickle | |
| 2010/0250867 A1* | 9/2010 | Bettger | G06F 17/30587 711/152 |
| 2010/0290445 A1 | 11/2010 | Ankaiah et al. | |
| 2012/0005746 A1 | 1/2012 | Wei et al. | |
| 2012/0179801 A1 | 7/2012 | Luna et al. | |

OTHER PUBLICATIONS

Shneyderman, Alex et al., "Mobile VPNs for Next Generation GPRS and UTMS Networks", Dec. 2, 2002, Retrieved on Jan. 2, 2012, http://theshoestring.com/index.php?articleID=1334&sectionID=41, 8 pages.

Yang, Kun et al., "Network-centric Context-aware Service over Integrated WLAN and GPRS Networks", PIMRC 2003, 14th IEEE 2003 International Symposium on Personal, Indoor and Mobile Radio Communications, Proceedings, Sep. 7-10, 2003, Beijing, China, http://context.upc.es/Papers/PIMRC%202003%20Context%20Paper.pdf, 1 page (Abstract Only).

* cited by examiner

NETWORK ACCESS CONTROL BASED ON RISK FACTOR

This application is based on and claims the benefit of priority from Taiwan Patent Application 101140276, filed on Oct. 31, 2012.

BACKGROUND

The present invention relates to network access control based on a risk factor, and more particularly, to a networking device, a computer network system, and a user terminal.

To ensure internal data security, enterprises or institutes usually channel visitors into a virtual private network (VPN) for login and access to internal resources. For more details, please visit the applicant's official website and read the technical document posted thereon and entitled "WebSphere Everyplace Connection Manager: increasing mobile security, reducing wireless costs."

Network engineers perform logical grouping on devices in different physical local area networks (LANs) by virtual local area network (VLAN) technology, so as to provide complete information security and protection for internal resources of enterprises or institutes.

For more related information, please visit the applicant's official website and read the technical documents posted thereon by Andrew Jones and others and entitled "IBM SmartCloud Enterprise tip," "Build multiple VPNs and VLANs: VPN and VLAN features and capabilities in IBM SmartCloud Enterprise 2.0," and "IBM SmartCloud Enterprise tip: Span virtual local area networks Provision and configure an instance that spans a public and private VLAN."

Please also make reference to U.S. Pat. No. 8,054,840, a patent owned by the applicant.

SUMMARY

The illustrative embodiment, in one of the aspects thereof, puts forth network access control based on a risk factor.

Despite their innocence, visitors who have logged in to access the internal resources of an enterprise can cause security flaws thereto because of inappropriate operation and configuration of a terminal or inadequate protection mechanism for connection or an extranet environment in which the terminal operates (as opposed to an intranet environment of the enterprise.)

In view of this, an illustrative embodiment comprises evaluating a risk factor in a visitor's causing security flaws while logging in to access the internal resources of an enterprise, wherein the security flaws are attributed to the visitor's terminal or an extranet environment in which the visitor's terminal is operating, and connecting the visitor's terminal to different internal resources (to thereby gain access thereto) according to the risk factor, wherein the visitor terminal is isolated from the other inaccessible internal resources, and thus the visitor's terminal is unaware of the locations of the other inaccessible internal resources.

In another aspect, depending on the risk factor, the visitor's terminal is given the authority to access an intranet resource, for example, be allowed to read from rather than write to an intranet resource and forbidden to read from or write to another intranet resource.

According to an embodiment, a networking device comprises:

a first communication interface coupled to a first LAN and a second LAN, the second LAN being different from the first LAN;

a second communication interface coupled to a network, the network being different from the second LAN and the first LAN; and a control module electrically connected to the first communication interface and the second communication interface, wherein a user terminal performs a network communication with the control module via the network, and the control module further determines whether to connect the user terminal to the first LAN or to the second LAN according to a risk factor of the user terminal.

According to another embodiment, a virtual private network server comprises:

a first communication interface coupled to at least an intranet resource;

a second communication interface coupled to an extranet; and a control module electrically connected to the first communication interface and the second communication interface and adapted to enable a virtual private network to access the intranet resource, wherein a user terminal performs a network communication with the control module via the extranet, and the control module specifies the authority for the user terminal to further access the intranet resource via the virtual private network according to a risk factor of the user terminal.

In other embodiments, a user terminal and a computer network system operate in conjunction with the aforesaid networking device and the aforesaid virtual private network server, respectively.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
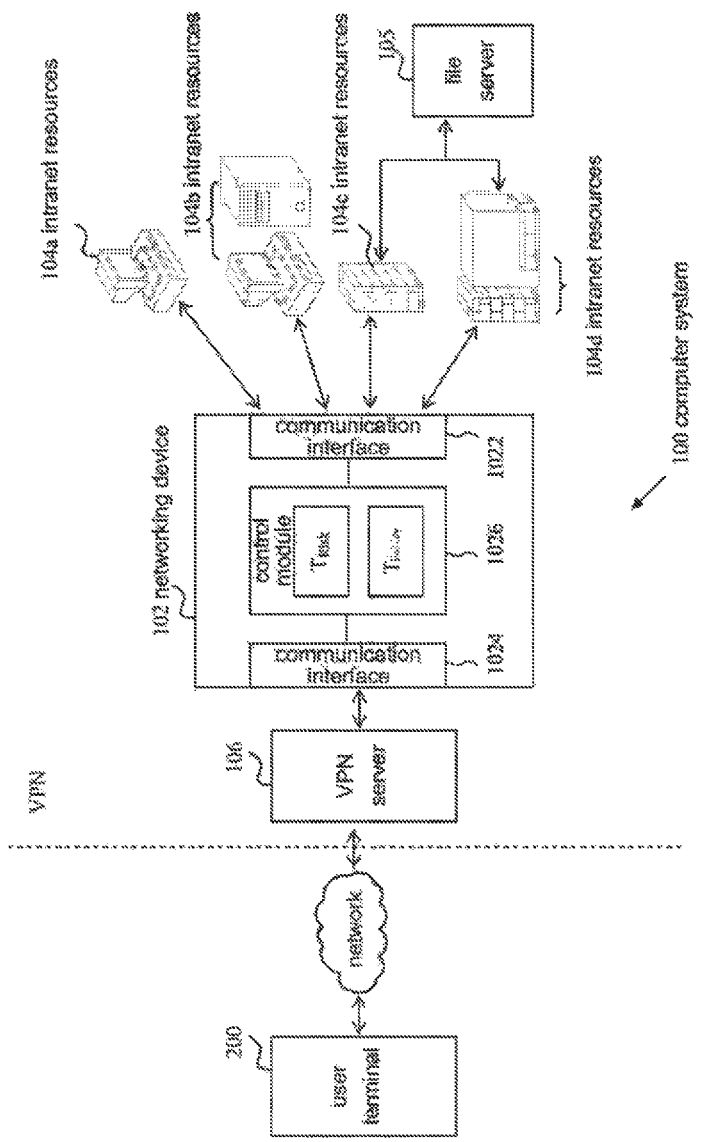
FIG. 1 shows a computer system according to an illustrative embodiment.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
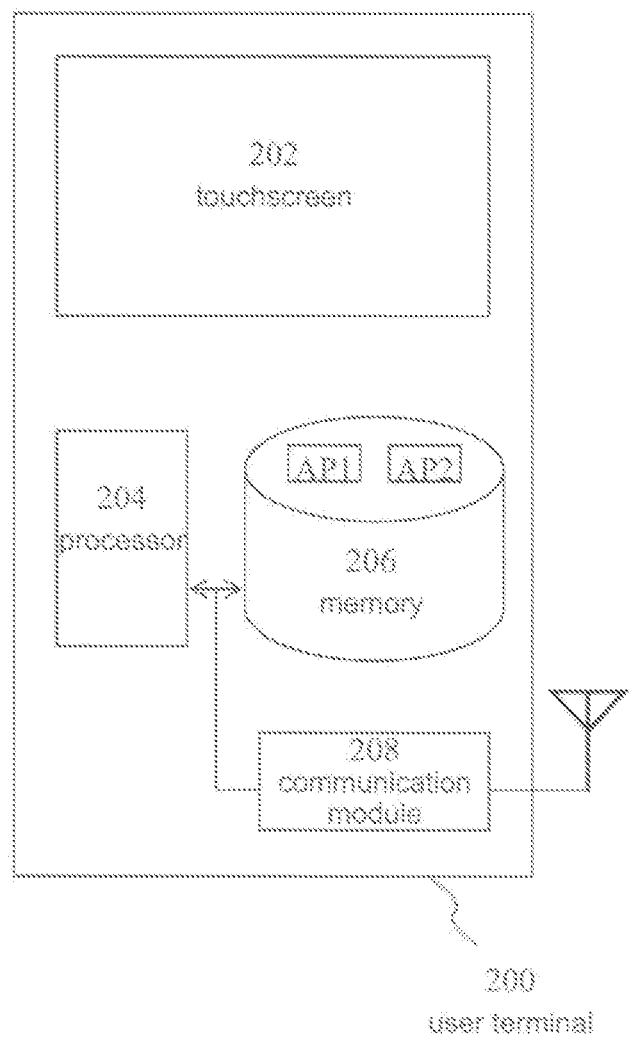
FIG. 2 is a flowchart of a method according to an illustrative embodiment.
Figure 3:
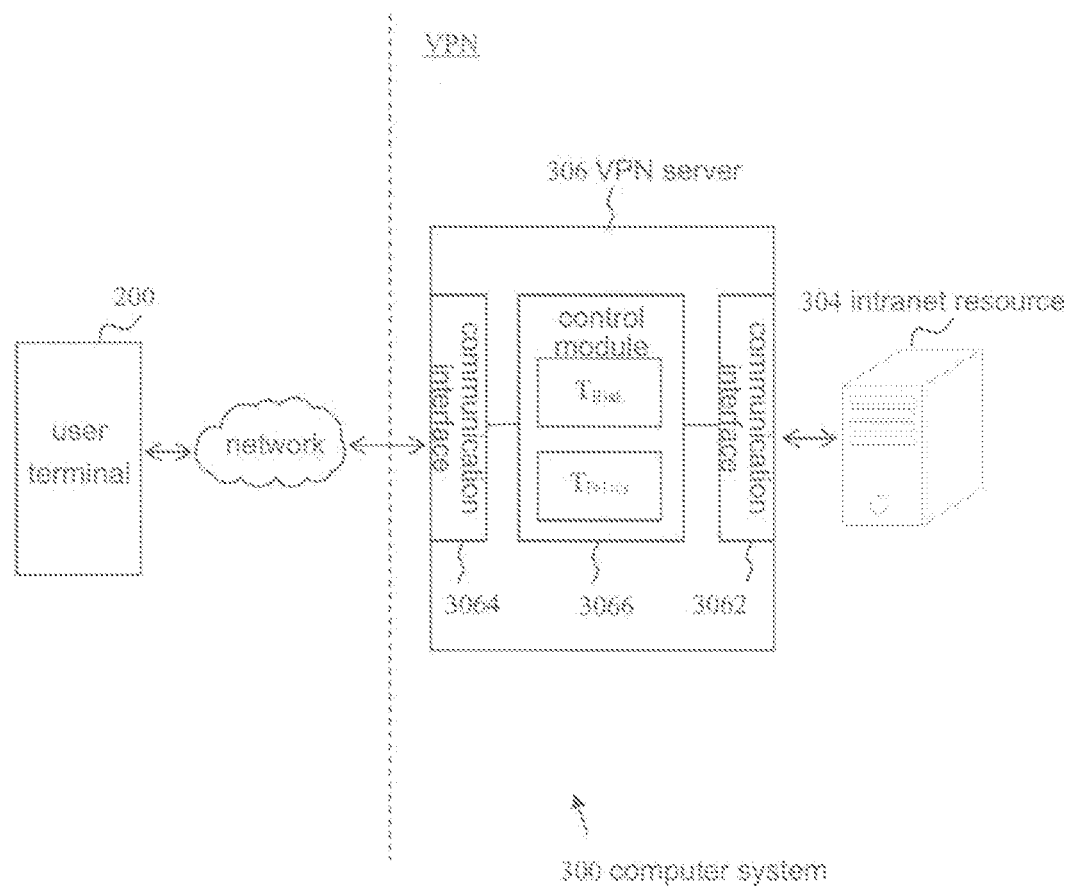
FIG. 3 shows a computer system according to another illustrative embodiment.

Referring now to FIG. 1 through FIG. 3, computer systems, methods, and computer program products are illustrated as structural or functional block diagrams or process flowcharts according to various embodiments. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

System Architecture

FIG. 1 is a schematic view of hardware architecture of a computer system 100 according to an embodiment of the present invention. The computer system 100 comprises a networking device 102 and intranet resources 104a-104d.

The networking device 102 could be a switch or a router, which is able to control the direction in which a network packet is forwarded. The networking device 102 comprises two communication interfaces 1022, 1024, and a control module 1026. Related details are described hereunder. For irrelevant parts of the networking device 102, please make reference to Cisco's switch products, such as Cisco Catalyst 3550 Series Switch.

The communication interface 1022 is coupled to the intranet resources 104a-104d. From the perspective of the networking device 102, the intranet resources 104a-104d are different network resources, for example, with different IP addresses, and thus the control module 1026 of the networking device 102 can discern an IP packet which is bound for or originates from any one of the intranet resources 104a-104d. The intranet resources 104a-104d are not limited to any specific network apparatuses or servers. The intranet resources 104a-104d comprise an unlimited number of network apparatuses, servers, or a combination thereof. For example, the intranet resources 104a-104d may come in the form of local area networks (LANs), respectively.

For illustration purposes, in the example illustrated with FIG. 1, the intranet resources 104a, 104b are a virtual local area network (VLAN) each. Nonetheless, physically, the intranet resources 104a, 104b can have a network apparatus or server in common. For example, the intranet resource 104a has a web server, whereas the intranet resource 104b comprises a web server and a file server, but the web server of the intranet resource 104a and the web server of the intranet resource 104b are physically the same. In general, the file server provides more access modes (such as uploading or deleting a file) than the web server does, whereas File Transfer Protocol (FTP) is less safe than HyperText Transfer Protocol (HTTP). Hence, the file server requires stricter access control than the web server does.

In another aspect, the intranet resources 104c, 104d are different network security apparatuses disposed between a file server 105 and the networking device 102 and adapted to provide different levels of security protection whenever a user terminal 200 accesses the file server 105, thereby preventing a hacker from attacking the file server 105 via the user terminal 200, for example. For instance, the intranet resource 104c is a firewall, whereas the intranet resource 104d comes in the form of a combination of a firewall and an intrusion prevention system (IPS) provides better security protection than the intranet resource 104c does.

The computer system 100 further comprises a virtual private network server (VPN server) 106 coupled to the communication interface 1024 of the networking device 102. The virtual private network server 106 provides a virtual private network VPN for the user terminal 200, as shown in FIG. 1. Hence, the user terminal 200 has to log in the virtual private network server 106 before being subjected to authentication and authorization. Afterward, after being connected to the virtual private network VPN, the networking device 102 makes reference to the risk factor and determines to connect the user terminal 200 to one of the intranet resources 104a-104d. More related details are described later. In some embodiments, the virtual private network server 106 is optional; that is to say, the connection of the user terminal 200 and one of the intranet resources 104a-104d does not necessarily require the connection of the virtual private network VPN and the networking device 102. In another embodiment, the user terminal 200, the networking device 102, and the intranet resources 104a, 104b are located at the intranet of an enterprise and thus can dispense with the virtual private network VPN.

User Terminal

The user terminal 200 comes in the form of a typical notebook computer or portable information device, such as an Apple's product, including iPhone™ or iPad™. Referring to FIG. 2, the user terminal 200 comprises a touchscreen 202, a processor 204, a memory 206, and a communication module 208. The touchscreen 202 is capable of information display and input. The processor 204 is a central processor manufactured by ARM™ and adapted to be for use with a portable information device. The memory 206 is a flash memory for storing a computer-executable instruction of network communication application AP1 and risk factor application AP2, such that the processor 204 can access and execute the computer-executable instruction. For the fundamental implementation aspects of network communication application AP1 and risk factor application AP2, make reference to existing applications executable on iPhone™ or an operating system (not shown) directly integrated into the user terminal 200. The communication module 208 comes in the form of Qualcomm's MDM6610 communication chip, or the like, which enables wired or wireless (including UMTS, GSM, or Wi-Fi) network connection and thus can connect to the virtual private network server 106 (or the networking device 102 if the virtual private network server 106 is absent) via a network (such as a local area network (LAN), a wide area network (WAN), or the public Internet.)

Despite their absence in the accompanying drawings, other hardware and software components (such as an additional computer system, a router, or a firewall) can be positioned at a network connected between the virtual private network server 106 (or the networking device 102) and the user terminal 200.

Network communication application AP1 comes in the form of TELNET connection application, HTTP browser, FTP connection application, or VOIP connection application. Once the user terminal 200 gets connected to the virtual private network server 106, network communication application AP1 will have a related virtual private network client-end application for login to the virtual private network server 106 to thereby undergo authentication and authorization, and, afterward, perform data communication encryption/decryption as well as selective zipping/unzipping service on the virtual private network VPN. For more related information, make reference to Cisco's VPN Client applications.

Risk Factor

Among its other purposes, the risk factor application AP2 is intended to obtain metadata of the user terminal 200. In this embodiment, metadata includes, but is not limited to, the three major categories as follows:

First, metadata includes terminal profile of the user terminal 200. For example, risk factor application AP2 communicates with the operating system of the user terminal 200 to not only obtain the model number of the user terminal 200 device or the type and version (such as iOS™ 6) of the operating system, but also obtain the details about each of the applications installed under the operating system, especially the type and version of network communication application AP1 or the type and version of antivirus applications or information security protection applications. In general, terminal profile obtained through the operating system of the user terminal 200 can be collected, in the form of metadata, by risk factor application AP2.

Second, metadata includes connection mode characteristics of the user terminal 200. Connection mode characteristics relate to connection modes supported by the communication module 208 of the user terminal 200 and can typically be obtained by means of the operating system of the user terminal 200. For example, connection mode characteristics include authentication or encryption mode (such as WPA2, AES, or TKIP) required for creating a connection by wired network or wireless network (including UMTS, GSM, or Third, metadata includes network characteristics of the user terminal 200, that is, network characteristics between the user terminal 200 and the next network node. In general, network characteristics has nothing to do with the user terminal 200 but relates to the environment in which the user terminal 200 is operating. Network characteristics can be obtained by means of the operating system of the user terminal 200. For example, network characteristics include the names of network service providers (ISP) and locations (countries or cities) of networks. A static IP address or a dynamic IP address is assigned to the user terminal 200.

Access Control

Upon acquisition of metadata, risk factor application AP2 sends metadata to the networking device 102 via the virtual private network server 106, such that the control module 1026 of the networking device 102 determines a current risk factor (for example, by risk factor table $T_{Risk}$) of the user terminal 200 according to metadata. In another embodiment, risk factor application AP2 determines a risk factor according to metadata and then sends the determined risk factor to the networking device 102 via the virtual private network server 106.

After determining the current risk factor of the user terminal 200, the control module 1026 further determines connecting the user terminal 200 to one of the intranet resources 104a-104d (for example, by another table $T_{Policy}$). In this embodiment, if the current risk factor of the user terminal 200 carries a high risk (i.e., low security), the control module 1026 will connect or assign the user terminal 200 to the intranet resource 104a that has a web server only instead of the intranet resource 104b that has a file server or connect the user terminal 200 to the intranet resource 104d provided in the form of a combination of a firewall and an intrusion prevention system (IPS) and capable of providing a high level of security protection instead of the intranet resource 104c (having only a firewall.)

In the embodiment illustrated with FIG. 1, table $T_{Risk}$ and table $T_{Policy}$ are disposed in the control module 1026 (for example, in the form of firmware). By contrast, in the other embodiments, table $T_{Risk}$ and table $T_{Policy}$ are disposed in memory devices (not shown) in the networking device 102 and accessible to the control module 1026 through direct connection. In another embodiment, table $T_{Risk}$ and table $T_{Policy}$ can even be disposed in storage devices (not shown) outside the networking device 102 and accessible to the control module 1026 via a network.

In this embodiment, as soon as the user terminal 200 gets coupled to an intranet resource (such as the intranet resource 104a) through the control module 1026, the user terminal 200 will be isolated from the other intranet resources (that is, the intranet resources 104b-10d) in terms of network communication.

To provide effective access control, it is necessary that risk factor application AP2 gives instant response to any change (for example, a switch from household wired network connection to public wireless network connection) in the current risk factor of the user terminal 200, informs the control module 1026 of the change, and adjusts the assignment of appropriate intranet resources to the user terminal 200 as needed. Take the intranet resource 104c and the intranet resource 104d as an example, the control module 1026 instantly and dynamically connect or assign the user terminal 200 to the intranet resource 104c (having only a firewall) or the intranet resource 104d (provided in the form of a combination of a firewall and an intrusion prevention system (IPS)) so as for the user terminal 200 to access the file server 105 subsequently without interrupting their connection with the user terminal 200.

In another embodiment, the user terminal 200 lacks risk factor application AP2 and thus fails to provide metadata for determining the risk factor. In view of this, the networking device 102 determines the risk factor according to received header data (such as source addresses) in an IP packet sent from the user terminal 200. In another aspect, the control module 1026 of the networking device 102 determines the type (such as desktop computer or mobile phone) of the user terminal 200 or the type of the operating system according to the message transmitted from network communication application AP1 (such as HTTP browser) to thereby further determine the risk factor. Although the aforesaid two ways of determining a risk factor might be outperformed by the way of determining a risk factor according to metadata, the aforesaid two ways of determining a risk factor have an advantage, that is, it is not necessary for risk factor application AP2 to be installed in the user terminal 200.

FIG. 3 is a schematic view of hardware architecture of a computer system 300 according to another embodiment. The computer system 300 is similar to the computer system 100 of FIG. 1 and thus is not described in detail herein for the sake of brevity.

Referring to FIG. 1, the networking device 102 of the computer system 100 provides access control over the user terminal 200 according to the risk factor. By contrast, in the computer system 300, a virtual private network server (VPN server) 306 designates the authority for the user terminal 200 to access an intranet resource 304 according to the risk factor.

Like the networking device 102 of FIG. 1, the virtual private network server 306 comprises two communication interfaces 3062, 3064 and a control module 3066. The communication interface 3062 is coupled to the intranet resource 304 (such as a file server.) The communication interface 3064 is coupled to the user terminal 200.

The user terminal 200 has to log in the virtual private network server 306 before being subjected to authentication and authorization. Afterward, the user terminal 200 gets connected to the intranet resource 304 via the virtual private network \TN. After determining the current risk factor of the user terminal 200 (see the above description of the control module 1026, for example, by table $T_{Risk}$), the control module 3066 further designates the authority for the user terminal 200 to access the intranet resource 304 (for example, by table $T_{Policy}$).

In this example, if the current risk factor of the user terminal 200 carries a high risk (i.e., low security), the control module 3066 will designate the authority for the user terminal 200 to "read only" the intranet resource 304. Conversely, if the current risk factor of the user terminal 200 carries a low risk (i.e., high security), the control module 3066 will designate the authority for the user terminal 200 to "write" to the intranet resource 304.

In this embodiment, even if visitors use the same username to log in the virtual private network server 306, the access authority designated by the virtual private network server 306 to the user terminal 200 will depend on the current risk factor of the user terminal 200, such as terminal profile, connection mode characteristics, or network characteristics of the user terminal 200.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The invention claimed is:

1. A networking device, comprising:
    a first communication interface coupled to a first local area network (LAN) and a second LAN, the second LAN being different from the first LAN;
    a second communication interface coupled to a virtual private network via a virtual private network server, the virtual private network being different from the second LAN and the first LAN, wherein a user terminal connects to the virtual private network via a network communication application executing on the user terminal; and
    a control module electrically connected to the first communication interface and the second communication interface, wherein the user terminal performs a network communication with the control module via the virtual private network, wherein the control module determines a risk factor of the user terminal according to metadata received from a risk factor application executing on the user terminal, and wherein the control module determines whether to connect the user terminal to the first LAN or to the second LAN according to the risk factor of the user terminal.

2. The networking device of claim 1, wherein the first LAN and the second LAN are virtual local area networks (VLANs).

3. The networking device of claim 1, wherein the control module determines the risk factor according to a terminal profile of the user terminal.

4. The networking device of claim 1, wherein the control module determines the risk factor according to connection mode characteristics of the user terminal.

5. The networking device of claim 1, wherein the control module determines the risk factor according to network characteristics of the network.

6. The networking device of claim 1, wherein the control module determines the risk factor according to an Internet Protocol (IP) packet header in the network communication.

7. The network device of claim 1, wherein a virtual private network server is disposed in the network, coupled to the networking device, and adapted to provide the virtual private network on the network, thereby allowing visitors to perform network communication with the control module via the virtual private network.

8. The network device of claim 1, wherein the user terminal executes the risk factor application to collect the metadata of the user terminal, such that the metadata is provided to the control module to allow the control module to determine the risk factor.

9. The network device of claim 1, wherein the network communication application is for use in login to the virtual private network server to further perform the network communication with the control module via the virtual private network.

10. A method, comprising:
    receiving, by a control module of a network device, a network communication from a risk factor application executing on a user terminal via a virtual private network, wherein the network device comprises a first communication interface coupled to a first local area network (LAN) and a second LAN, the second LAN being different from the first LAN, and a second communication interface coupled to the virtual private network, the virtual private network being different from the first LAN and the second LAN, wherein the user terminal connects to the virtual private network via a network communication application executing on the user terminal;
    determining, by the control module, a risk factor of the user terminal according to metadata received from a risk factor application executing on the user terminal; and
    determining, by the control module, whether to connect the user terminal to the first LAN or to the second LAN according to the risk factor of the user terminal.

11. The method of claim 10, wherein the first LAN and the second LAN are virtual local area networks (VLANs).

12. The method of claim 10, wherein the control module determines the risk factor according to a terminal profile of the user terminal, connection mode characteristics of the user terminal, network characteristics of the network, or an Internet Protocol (IP) packet header in the network communication.

13. The method of claim 10, wherein a virtual private network server is disposed in the network, coupled to the networking device, and adapted to provide the virtual private network on the network, thereby allowing visitors to perform network communication with the control module via the virtual private network.

14. A computer program product comprising a non-transitory computer readable storage medium having a computer readable program stored therein, wherein the computer readable program, when executed on a network device, causes the network device to:
    receive, by a control module of the network device, a network communication from a user terminal via a virtual private network, wherein the network device comprises a first communication interface coupled to a first local area network (LAN) and a second LAN, the second LAN being different from the first LAN, and a second communication interface coupled to the virtual private network, the virtual private network being different from the first LAN and the second LAN, wherein the user terminal connects to the virtual private network via a network communication application executing on the user terminal; and
    determine, by the control module, a risk factor of the user terminal according to metadata received from a risk factor application executing on the user terminal; and
    determine, by the control module, whether to connect the user terminal to the first LAN or to the second LAN according to the risk factor of the user terminal.

15. The computer program product of claim 14, wherein the control module determines the risk factor according to a terminal profile of the user terminal, connection mode characteristics of the user terminal, network characteristics of the network, or an Internet Protocol (IP) packet header in the network communication.

16. The computer program product of claim 14, wherein a virtual private network server is disposed in the network, coupled to the networking device, and adapted to provide the virtual private network on the network, thereby allowing visitors to perform network communication with the control module via the virtual private network.

* * * * *